US012290833B1

(12) United States Patent
White et al.

(10) Patent No.: US 12,290,833 B1
(45) Date of Patent: May 6, 2025

(54) NOZZLE FOR APPLICATION OF A SEAM SEALER

(71) Applicant: Craftech Innovations LLC, Louisville, KY (US)

(72) Inventors: Anthony W. White, Louisville, KY (US); Andrew Godfrey, New Albany, IN (US)

(73) Assignee: Craftech Innovations LLC, Louisville, KY (US)

( * ) Notice: Subject to any disclaimer, the term of this patent is extended or adjusted under 35 U.S.C. 154(b) by 400 days.

(21) Appl. No.: 17/752,040

(22) Filed: May 24, 2022

Related U.S. Application Data

(60) Provisional application No. 63/192,604, filed on May 25, 2021.

(51) Int. Cl.
*B05C 5/02* (2006.01)
*B05B 1/04* (2006.01)
*B05C 17/005* (2006.01)

(52) U.S. Cl.
CPC ............ *B05C 5/0254* (2013.01); *B05B 1/044* (2013.01); *B05C 17/00506* (2013.01); *B05C 17/00516* (2013.01)

(58) Field of Classification Search
CPC ........ B05C 17/00506; B05C 17/00516; B05C 5/0254; B44D 3/22–225
See application file for complete search history.

(56) References Cited

U.S. PATENT DOCUMENTS 2,065,298 A * 12/1936 Abbott .............. B05C 17/00516 401/266
2,855,897 A * 10/1958 Benkowski .............. B43K 8/00 401/241
2,982,987 A * 5/1961 Knapp .................. B65D 47/42 15/236.08
3,411,178 A * 11/1968 Szentivanszky ............................ B05C 17/00596 425/461
3,589,820 A * 6/1971 Ward ...................... B29C 65/54 401/266

(Continued)

OTHER PUBLICATIONS

3M, Automotive Aftermarket Division, Seam Sealer Tip Kit, PN 08200, 2007.

(Continued)

*Primary Examiner* — Paul R Durand
*Assistant Examiner* — Randall A Gruby
(74) *Attorney, Agent, or Firm* — Stites & Harbison, PLLC; David W. Nagle, Jr.

(57) ABSTRACT

A nozzle is configured to receive and mate with a dispensing tube of a cartridge of sealer. The nozzle includes: a central body having a first end and a second end, with the central body further defining an interior volume; and a guide member extending from the central body of the nozzle. The first end of the central body is open and is configured to receive the dispensing tube. The second end of the central body defines a slit via which the sealer is dispensed. In use, a leading portion of the guide member extends beyond the slit and engages an edge of a panel to which the sealer is applied. The nozzle may also include a series of raised protrusions on an interior wall surface of the central body, which engage and press into the dispensing tube, creating an interference fit that assists in holding the nozzle in place.

9 Claims, 5 Drawing Sheets

(56) References Cited

U.S. PATENT DOCUMENTS 4,260,273 A * 4/1981 Hemperly, Jr. ......... E04F 21/22 401/48
4,546,906 A * 10/1985 Vadnais ................ B05C 17/005 222/502
4,637,531 A * 1/1987 Olsson ................. B65D 47/286 222/327
4,957,225 A * 9/1990 Childers ........... B05C 17/00596 425/458
5,046,877 A * 9/1991 Longo .................... B65D 35/38 401/48
5,249,716 A * 10/1993 O'Sullivan ....... B05C 17/00596 222/326
5,250,145 A * 10/1993 Despins ............ B05C 17/00516 156/578
5,605,259 A * 2/1997 Clawson .............. B65D 83/752 222/402.1
5,984,557 A * 11/1999 Fennell ............. B05C 17/00516 401/266
6,161,730 A * 12/2000 Heusser ............ B05C 17/00553 222/137
6,807,704 B2 * 10/2004 Nishitani ............... B44D 3/225 15/166
6,974,090 B2 * 12/2005 Brax ................. B05C 17/00516 222/509
D524,648 S * 7/2006 Feist ................................ D28/7
7,708,211 B2 * 5/2010 Maier ............... B05C 17/00516 239/513
9,072,570 B2 * 7/2015 Maurat ............. B05C 17/00516
9,993,837 B2 * 6/2018 Ullett .................. B05C 17/0123
10,070,907 B2 * 9/2018 Dupuy ............... A61B 17/8811
10,780,454 B2 * 9/2020 Summons ......... B05C 17/00516
11,794,206 B2 * 10/2023 Assis, Jr. ............ B05C 17/0052
2004/0169053 A1 * 9/2004 Liljeqvist .......... B05C 17/00516 222/391
2006/0163293 A1 * 7/2006 Peay .................. B65D 83/0005 222/327
2018/0022511 A1 * 1/2018 Devine .................. B65D 47/06 401/193
2022/0331834 A1 * 10/2022 Springhorn ....... B05C 17/00503

OTHER PUBLICATIONS

SEM Products, Inc., Dual-Mix Product Information and Standard Operating Procedures, 2020.

* cited by examiner

NOZZLE FOR APPLICATION OF A SEAM SEALER

CROSS-REFERENCE TO RELATED APPLICATIONS

The present application claims priority to U.S. Patent Application Ser. No. 63/192,604 filed on May 25, 2021, the entire disclosure of which is incorporated herein by reference.

BACKGROUND OF THE INVENTION

The present invention relates to the repair of automobiles, and, more particularly, the application of a seam sealer as part of such repair.

In the manufacture and assembly of automobiles, a sealer (or sealant) is used to provide an airtight and/or watertight seal between adjacent or overlapped panels. Of course, in the manufacture and assembly of automobiles, robots are used to apply the sealer, resulting in a very precise application of the sealer.

In repairing damaged automobiles, a sealer is similarly used as part of the repair process to restore the automobile to its original condition and to prevent corrosion that can result in the introduction of water via gaps in adjacent or overlapped panels. In a repair shop, however, the sealer is typically applied manually. Specifically, a technician often uses masking tape to mark off the area for application of the sealer and then applies it using a manual or pneumatic applicator (often referred to as a "dispensing gun") that dispenses the sealer from a cartridge. In this regard, the cartridge typically has a cylindrical shape and defines an interior volume, with a nozzle that is in fluid communication with the interior volume and provides a pathway for dispensing the sealer from the cartridge. The nozzle is often in the form of an elongated dispensing tube with an open end. However, such a nozzle is not designed for, nor is it particularly well-suited for, precise application of the sealer.

SUMMARY OF THE INVENTION

The present invention is a nozzle for application of a seam sealer.

An exemplary nozzle made in accordance with the present invention can be characterized as including a central body having a first end and a second end, with the central body further defining an interior volume. The first end of the central body is open and is configured to receive the standard nozzle (or elongated dispensing tube) of a cartridge of seam sealer. The second end of the central body then defines a slit via which the sealer is dispensed.

In some embodiments, the lower portion of the interior volume defined by the central body has a substantially constant cross-sectional shape. The lower portion of the interior volume defined by the central body is configured to receive and mate with the standard nozzle (or elongated dispensing tube) of a cartridge of seam sealer.

In some embodiments, there is a series of raised protrusions on an interior wall surface of the central body, which engage and press into the dispensing tube, creating an interference fit that assists in holding the nozzle in place.

In some embodiments, the upper portion of the interior volume defined by the central body has a cross-sectional shape that decreases in area as it moves upward toward the slit defined by the second end of the central body. Thus, the upper portion of the interior volume defined by the central body effectively acts as a funnel, directing the seam sealer to and out of the slit.

As noted above, the nozzle also includes a guide member, which is integral with or otherwise mounted to a lateral surface to the central body of the nozzle, with a leading portion (or stem) of the guide member extending beyond the slit.

Prior to use, the nozzle is first placed over the standard nozzle (or elongated dispensing tube) of a cartridge of seam sealer, with the lower portion of the interior volume defined by the central body receiving and mating with the dispensing tube. As noted above, if present, the raised protrusions on an interior wall surface of the central body engage and press into the elongated tube.

As the manual or pneumatic applicator is used to dispense the seam sealer, the sealer is advanced into the upper portion of the interior volume defined by the central body. Because the upper portion of the interior volume defined by the central body preferably has a cross-sectional shape that decreases as it moves upward toward the slit defined by the second end of the central body, a force is applied to the second end of the central body that effectively urges the nozzle away from the cartridge. The raised protrusions and their engagement with the dispensing tube counteract this force and assist in holding the nozzle in place.

In use, the nozzle is positioned with the slit adjacent the seam to which the sealer is to be applied. At the same time, the leading portion of the guide member is positioned to engage an edge of the automotive panel. The user then moves the nozzle along the length of the seam as the sealer is dispensed via the slit. During such movement, the guide member guides the nozzle and ensures that the sealer is applied in a relatively straight line, without the need for masking tape or similar tools.

DETAILED DESCRIPTION OF THE INVENTION

The present invention is a nozzle for application of a seam sealer.

Figure 1:
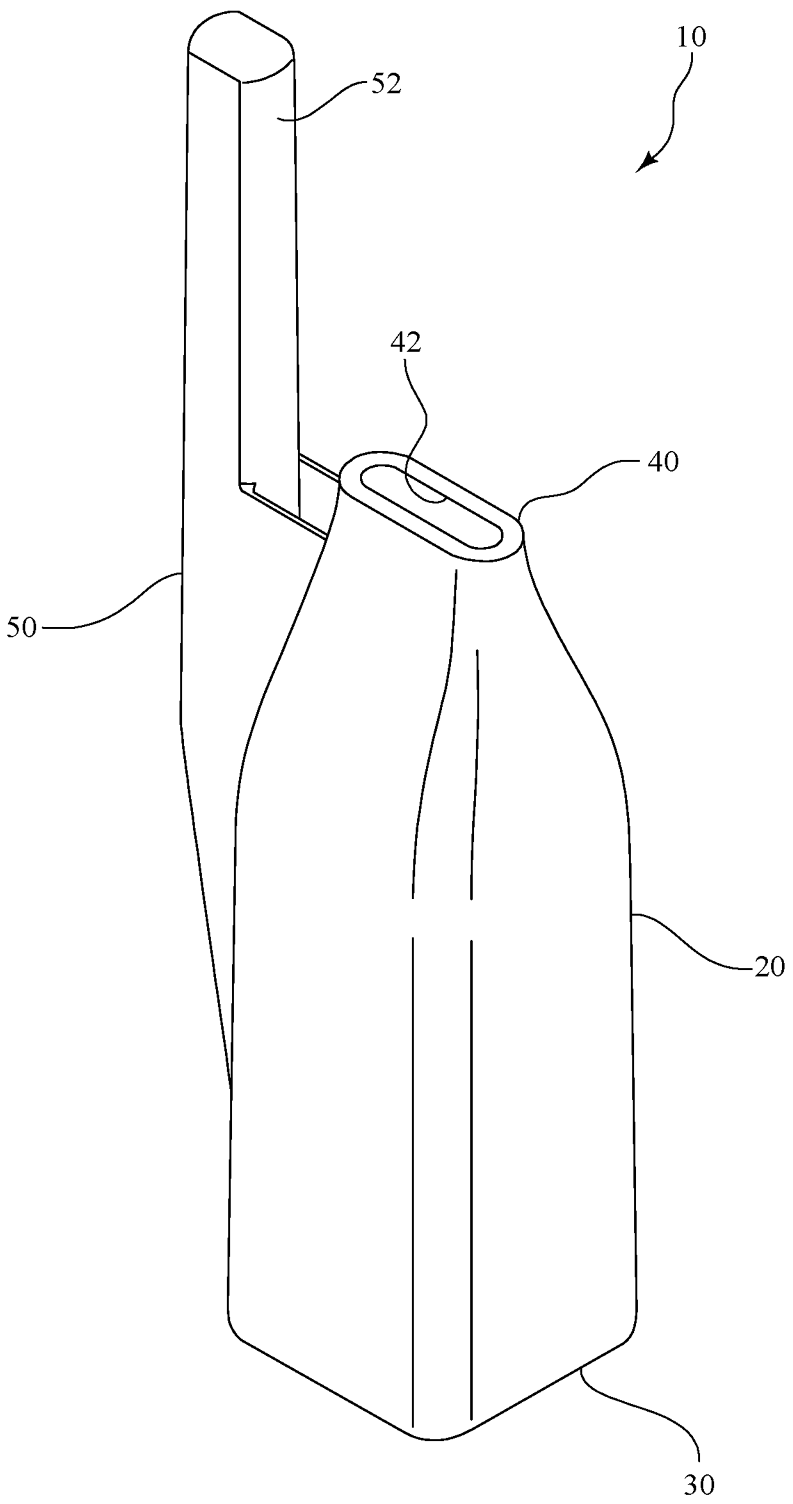
FIG. 1 is a perspective view of an exemplary nozzle made in accordance with the present invention.
Figure 2:
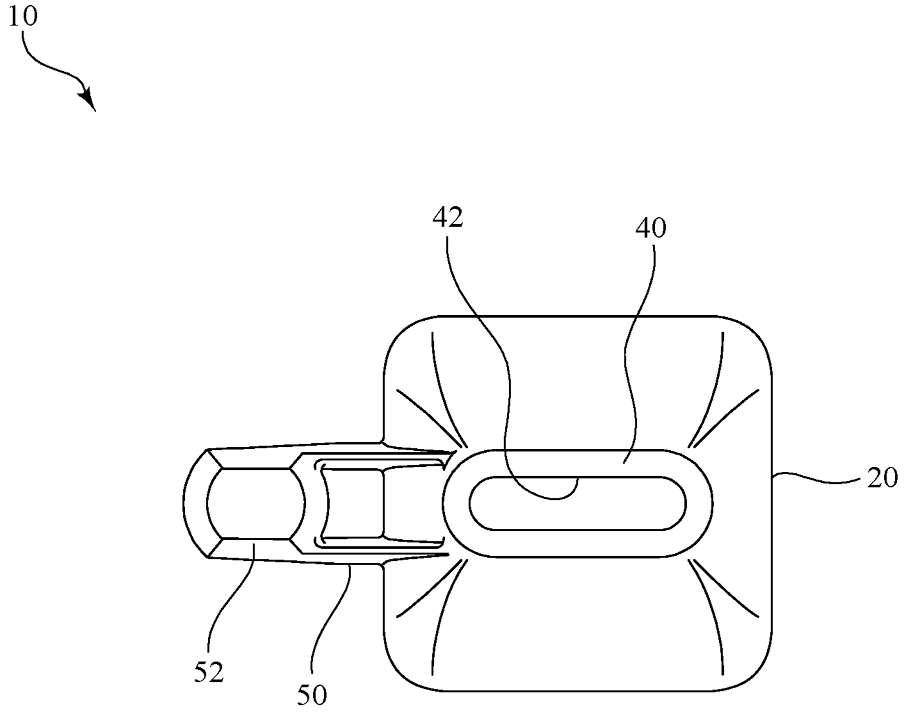
FIG. 2 is a top view of the exemplary nozzle of FIG. 1.
Figure 3:
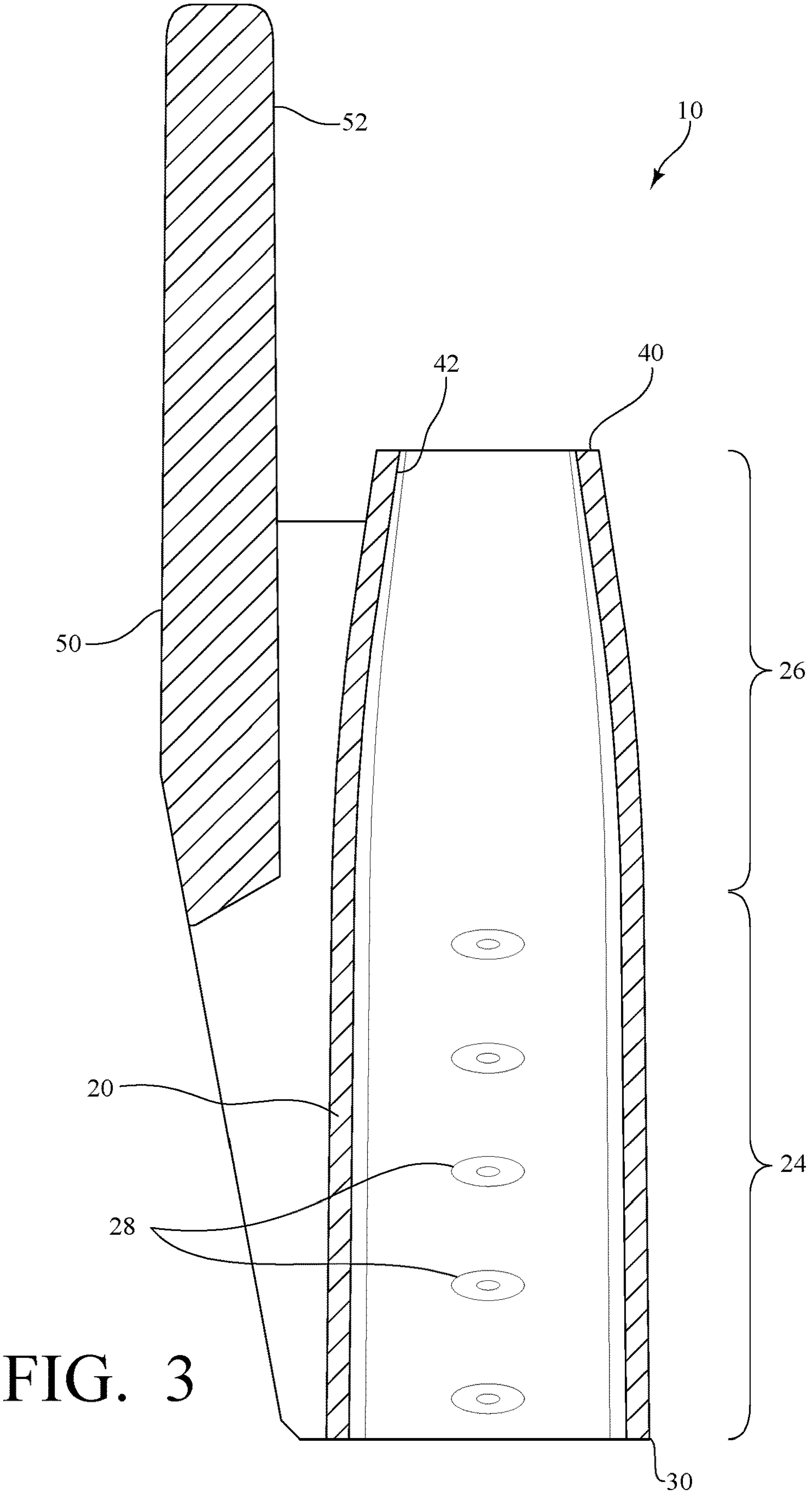
FIG. 3 is a side-sectional view of the exemplary nozzle of FIG. 1.

Referring now to FIGS. 1-3, an exemplary nozzle 10 made in accordance with the present invention can be characterized as including a central body 20 having a first end 30 and a second end 40, with the central body 20 further defining an interior volume. As best shown in FIG. 3, the first end 30 of the central body 20 is open. Furthermore, in this exemplary embodiment, the first end 30 of the central body 20 has a generally square shape and is configured to receive the standard nozzle (or elongated dispensing tube) of a cartridge of seam sealer, as further described below. As best shown in FIGS. 1 and 2, the second end 40 of the central body 20 defines a slit 42 via which the sealer is dispensed, as further described below.

Referring now to FIG. 3, the lower portion 24 of the interior volume defined by the central body 20 has a substantially constant cross-sectional shape. The lower portion 24 of the interior volume defined by the central body 20 (which is near the first end 30) is configured to receive and mate with the standard nozzle (or elongated dispensing tube) of a cartridge of seam sealer. Furthermore, in this exemplary embodiment, and as shown in FIG. 3, there is a series of raised protrusions 28 on an interior wall surface of the central body 20, which engage and press into the dispensing tube, creating an interference fit that assists in holding the nozzle 10 in place, as further described below. In this exemplary embodiment, such raised protrusions 28 are not only on the interior wall surface shown in FIG. 3, but also on the opposing wall surface.

Furthermore, with respect to the raised protrusions 28, through experimentation, Applicant discovered that creating internal circumferential ridges could create an interference fit, but was not optimal from a manufacturing perspective. Specifically, as a result of the square/rectangular profile of the cross-sectional shape, the "flat" wall portions are more flexible than the "corner" portions; thus, the "flat" wall portions would readily release from an injection mold, but the "corner" wall portions would not so readily release. Thus, in this exemplary embodiment and as shown in FIG. 3, the raised protrusions 28 intentionally do not extend into the corners of the lower portion 24 of the central body 20, but rather are only the two opposing wall surfaces as shown.

Referring still to FIG. 3, the upper portion 26 of the interior volume defined by the central body 20 has a cross-sectional shape that decreases in area as it moves upward toward the slit 42 defined by the second end 40 of the central body 20. Thus, the upper portion 26 of the interior volume defined by the central body 20 effectively acts as a funnel, directing the seam sealer to and out of the slit 42.

Referring again to FIGS. 1-3, the exemplary nozzle 10 also includes a guide member 50. As shown in this exemplary embodiment, the guide member 50 is integral with or otherwise mounted to a lateral surface to the central body 20 of the nozzle 10, with a leading portion 52 (or stem) of the guide member 50 extending beyond the slit 42, the importance of which is described below.

Figure 3A:
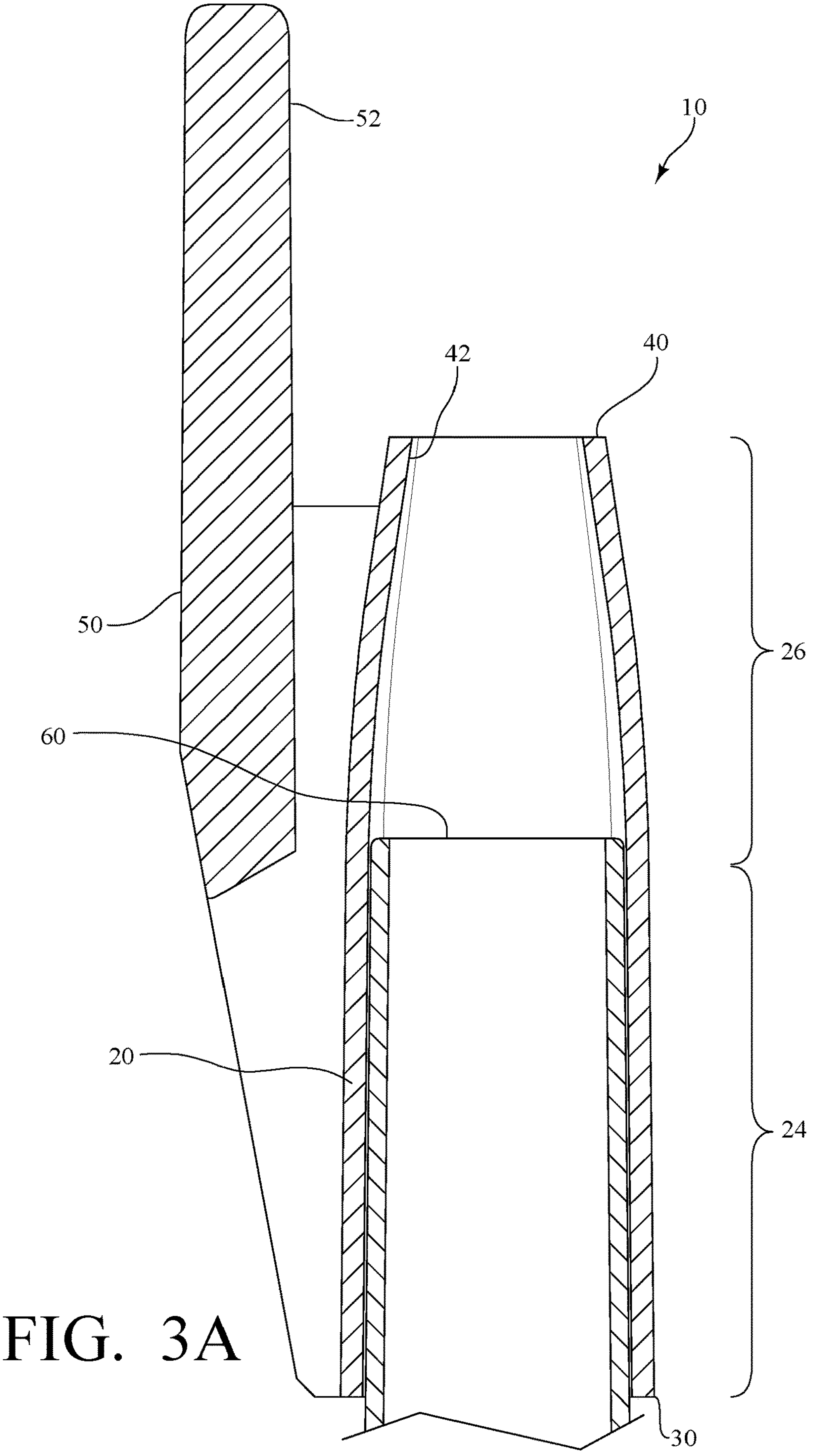
FIG. 3A is a side-sectional view substantially identical to FIG. 3, but with a dispensing tube of a cartridge of seam sealer received in the lower portion of the interior volume defined by the central body of the exemplary nozzle.

Prior to use, the nozzle 10 is first placed over the standard nozzle (or elongated dispensing tube) of a cartridge of seam sealer, with the lower portion 24 of the interior volume defined by the central body 20 receiving and mating with the dispensing tube. FIG. 3A is a side-sectional view substantially identical to FIG. 3, but further illustrates a dispensing tube 60 of a cartridge of seam sealer received in the lower portion 24 of the interior volume defined by the central body 20 of the exemplary nozzle 10. As described above, the raised protrusions 28 (see FIG. 3) on the interior wall surfaces of the central body 20 engage and press into the dispensing tube 60.

Figure 4:
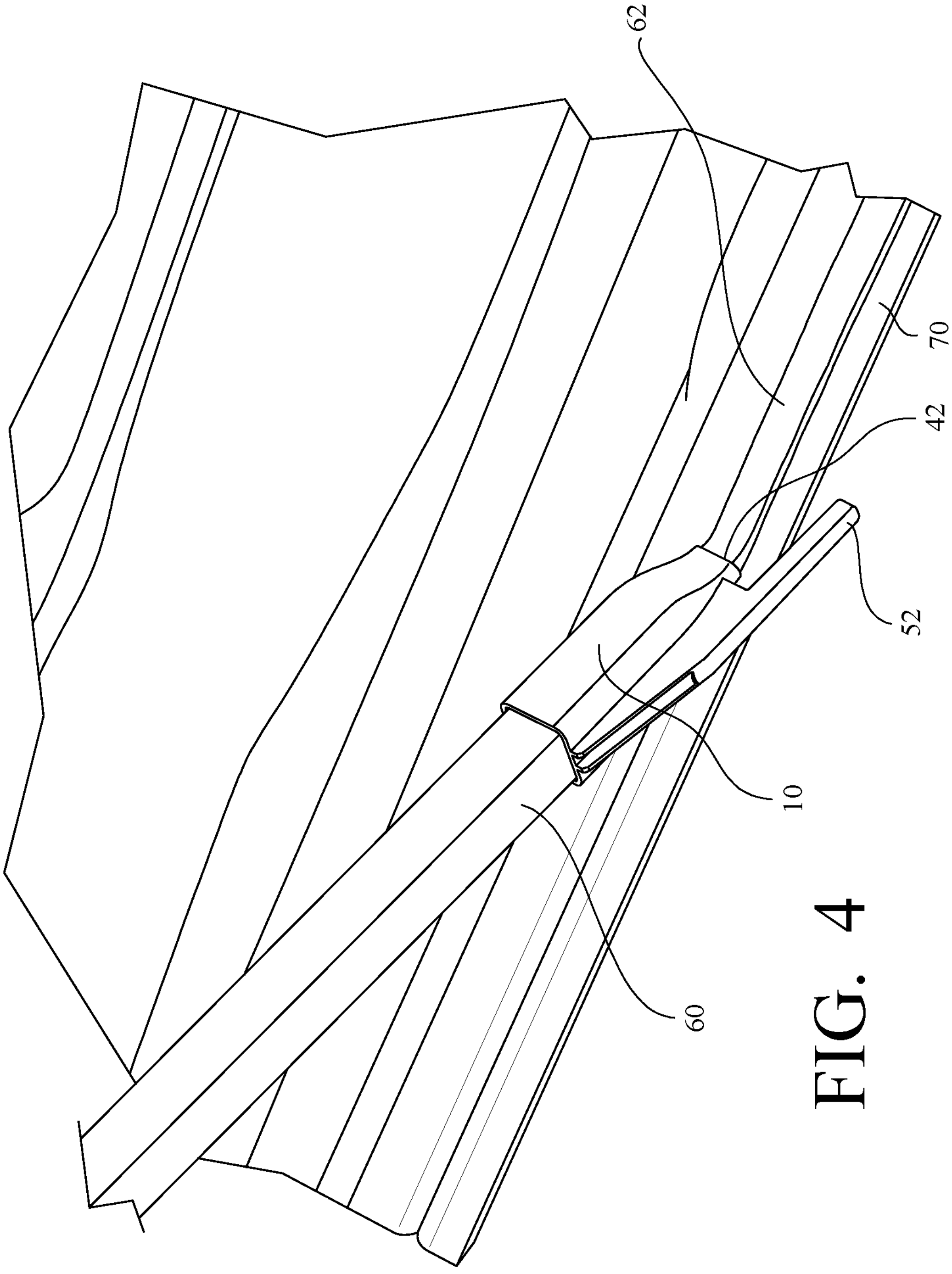
FIG. 4 illustrates the use of the exemplary nozzle of FIG. 1.

Referring now to FIGS. 3A and 4, as the manual or pneumatic applicator is used to dispense the seam sealer, the sealer is advanced into the upper portion 26 of the interior volume defined by the central body 20. Because the upper portion 26 of the interior volume defined by the central body 20 has a cross-sectional shape that decreases as it moves upward toward the slit 42 defined by the second end 40 of the central body 20, a force is applied to the second end 40 of the central body 20 that effectively urges the nozzle 10 away from the cartridge. The raised protrusions 28 and their engagement with the dispensing tube counteract this force and assist in holding the nozzle 10 in place.

Referring now specifically to FIG. 4, in use, the nozzle 10 is positioned with the slit 42 adjacent the seam to which the sealer is to be applied. At the same time, the leading portion 52 of the guide member 50 is positioned to engage an edge of the automotive panel 70. The user then moves the nozzle 10 along the length of the seam as the sealer 62 is dispensed via the slit 42. During such movement, the guide member 50 guides the nozzle 10 and ensures that the sealer is applied in a relatively straight line, without the need for masking tape or similar tools.

One of ordinary skill in the art will recognize that additional embodiments are also possible without departing from the teachings of the present invention. This detailed description, and particularly the specific details of the exemplary embodiment disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A nozzle configured to receive and mate with a dispensing tube of a cartridge of a sealer; comprising:

a central body having a first end and a second end, with the central body further defining an interior volume; and a guide member extending from the central body of the nozzle;

wherein the first end of the central body is open, has a rectangular cross-sectional shape including four wall portions, and is configured to receive and mate with the dispensing tube;

wherein the central body includes a series of raised protrusions on one or more of the four wall portions of the central body, which protrusions are configured to engage and press into the dispensing tube, creating an interference fit that, in use, assists in holding the nozzle in place;

wherein the second end of the central body defines a slit via which the sealer is dispensed; and wherein a leading portion of the guide member extends beyond the slit, and, in use, engages an edge of a panel to which the sealer is applied.

2. The nozzle as recited in claim 1, wherein a first series of the raised protrusions is on a first wall portion of the central body, and wherein a second series of the raised protrusions is on a second wall portion of the central body which is opposite the first wall portion.

3. The nozzle as recited in claim 1, wherein a lower portion of the interior volume defined by the central body, which is near the first end, has a constant cross-sectional shape and is configured to receive and mate with the dispensing tube.

4. The nozzle as recited in claim 3, wherein an upper portion of the interior volume defined by the central body, which is near the second end, has a cross-sectional shape that decreases in area, such that, in use, it directs the sealer to and out of the slit.

5. The nozzle as recited in claim 1, wherein the guide member is integral with or mounted to a lateral surface of the central body.

6. The nozzle as recited in claim 1, wherein the first end of the central body has a square cross-sectional shape including the four wall portions.

7. A nozzle configured to receive and mate with a dispensing tube of a cartridge of a sealer; comprising:

a central body having a first end and a second end, with the central body further defining an interior volume; and a guide member that is integral with or otherwise mounted to a lateral surface to the central body of the nozzle;

wherein the first end of the central body is open, has a rectangular cross-sectional shape including four wall portions, and is configured to receive and mate with the dispensing tube;

wherein a lower portion of the interior volume defined by the central body, which is near the first end, has a constant cross-sectional shape and is configured to receive and mate with the dispensing tube;

wherein the central body includes a series of raised protrusions on one or more of the four wall portions of the central body, which protrusions are configured to engage and press into the dispensing tube, creating an interference fit that, in use, assists in holding the nozzle in place;

wherein the second end of the central body defines a slit via which the sealer is dispensed;

wherein an upper portion of the interior volume defined by the central body, which is near the second end, has a cross-sectional shape that decreases in area, such that, in use, it directs the sealer to and out of the slit; and wherein a leading portion of the guide member extends beyond the slit, and, in use, engages an edge of a panel to which the sealer is applied.

8. The nozzle as recited in claim 7, wherein a first series of the raised protrusions is on a first wall portion of the central body, and wherein a second series of the raised protrusions is on a second wall portion of the central body which is opposite the first wall portion.

9. The nozzle as recited in claim 7, wherein the first end of the central body has a square cross-sectional shape including the four wall portions.

* * * * *